(12) United States Patent
Strobel

(10) Patent No.: US 6,263,685 B1
(45) Date of Patent: Jul. 24, 2001

(54) METHOD FOR DETERMINING THE TEMPERATURE INSIDE A MOTOR VEHICLE IN A RELIABLE MANNER

(75) Inventor: Henry Strobel, Sulzbach (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/423,255

(22) PCT Filed: Apr. 24, 1998

(86) PCT No.: PCT/EP98/02435

§ 371 Date: Feb. 8, 2000

§ 102(e) Date: Feb. 8, 2000

(87) PCT Pub. No.: WO98/50244

PCT Pub. Date: Nov. 12, 1998

(30) Foreign Application Priority Data

May 3, 1997 (DE) ............................................... 197 18 780

(51) Int. Cl.$^7$ .................................................... B60H 1/00
(52) U.S. Cl. ................. 62/133; 62/244; 62/296; 236/DIG. 19; 454/75
(58) Field of Search ................. 62/133, 158, 186, 62/244, 323.1, 239, 243, 177, 178, 179, 180, 408, 296; 236/DIG. 9, DIG. 19; 165/202, 203, 204, 42, 43; 454/75

(56) References Cited

U.S. PATENT DOCUMENTS

| 4,623,090 | * | 11/1986 | Heger | 236/DIG. 19 |
| 5,311,746 | | 5/1994 | Dombrowski et al. . | |
| 5,392,845 | * | 2/1995 | Honda et al. | 62/158 X |
| 5,564,625 | | 10/1996 | Straub . | |
| 5,731,953 | * | 3/1998 | Sakurai | 236/DIG. 19 |

FOREIGN PATENT DOCUMENTS 0659599A    6/1995   (DE) .

* cited by examiner

Primary Examiner—Harry B. Tanner
(74) Attorney, Agent, or Firm—Robert J. Depke; Mayer, Brown & Platt

(57) ABSTRACT

The invention relates to a method for reliably determining the temperature of the passenger compartment of a motor vehicle, in particular for controlling an air-conditioning system in the motor vehicle in which a sensor which detects the temperature of the passenger compartment of a motor vehicle is ventilated by a fan motor. In a method for determining the temperature of the passenger compartment, in which the noise nuisance from the fan motor is eliminated, another motor vehicle device which generates a noise is operated simultaneously with the fan motor.

10 Claims, 2 Drawing Sheets

METHOD FOR DETERMINING THE TEMPERATURE INSIDE A MOTOR VEHICLE IN A RELIABLE MANNER

BACKGROUND OF THE INVENTION

1. Field of the Invention

The invention relates to a method for reliably determining the temperature of the passenger compartment of a motor vehicle, in particular for controlling an air-conditioning system in the motor vehicle, in which a sensor which detects the temperature of the passenger compartment of a motor vehicle is ventilated by a fan motor, the fan motor being previously operated with another motor vehicle device which generates a noise.

2. Description of the Related Art

In control units for controlling air-conditioning systems in motor vehicles, NTC or PTC elements are used to measure the temperature of the passenger compartment of the motor vehicle. It is customary to suck in the internal air by means of a small, quietly running motor on which a blade wheel is mounted, and to ventilate the temperature sensor of the passenger compartment in this way. This fan motor runs as soon as, for example, the driver opens the vehicle door (U.S. Pat. No. 5,311,746) or an open signal of the central locking system activates the internal light or the stationary heating system and this is detected by the air-conditioning control unit. This means that the fan motor is already running before the ignition is switched on and continues to run for a certain time after the ignition has been switched off, in order to cool the temperature sensor of the passenger compartment. However, as soon as the drive motor of the motor vehicle is switched off, the noise nuisance from the fan motor is thought to be troublesome by the user of the vehicle. According to U.S. Pat. No. 5,311,746, the fan motor can also be switched on when the ignition is activated.

SUMMARY OF THE INVENTION

The invention is thus based on the object of specifying a method for determining the temperature of the passenger compartment, in which the noise nuisance from the motor is eliminated.

Since the fan motor does not start up until another motor vehicle device which generates a noise starts up, that is to say not until the ignition is actuated, the heating of the passenger compartment temperature sensor which is brought about by the later switching on of the fan motor is compensated at the time when the motor vehicle is started. The climatization control functions reliably because the system starts with the correct initial value. The device which generates a noise can either be the internal combustion engine of the motor vehicle or the ventilator of the air-conditioning system of the motor vehicle.

In one development, the heating of the sensor of the passenger compartment is determined by virtue of the fact that the time after the ignition of the motor vehicle is switched off and is switched on again is determined and this time is compared with a time threshold value. When the time threshold value is exceeded, the temperature of the internal combustion engine is measured, and, when a temperature threshold value of the internal combustion engine is exceeded, the passenger compartment temperature sensor is immediately ventilated by means of the fan motor. In a starting phase, the device which generates a noise is controlled in a delayed fashion with a first damping time in relation to the fan motor. The temperature of the internal combustion engine is determined by means of the temperature of the cooling water. correct flap position and the correct automatic blower operation.

In one refinement, the ambient temperature of the motor vehicle is measured when the time threshold value is undershot. The temperature of the passenger compartment is compared with the ambient temperature and, when the ambient temperature is exceeded, the temperature of the passenger compartment which is measured at the time when the internal combustion engine is switched off is used to control the air-conditioning system for all rising temperatures of the passenger compartment.

In this way, the air-conditioning system is thus reliably prevented from starting in the cooling mode although the heating mode would actually be necessary.

BRIEF DESCRIPTION OF THE DRAWINGS

The invention permits numerous embodiment possibilities. One of these will be explained in more detail with reference to the figures illustrated in the drawing, in which:

Identical features are identified with identical reference symbols.

In FIG. 1, the air-conditioning unit 1 is illustrated in its specific arrangement in the motor vehicle 12.

DETAILED DESCRIPTION OF THE PRESENTLY PREFERRED EMBODIMENTS

Figure 1:
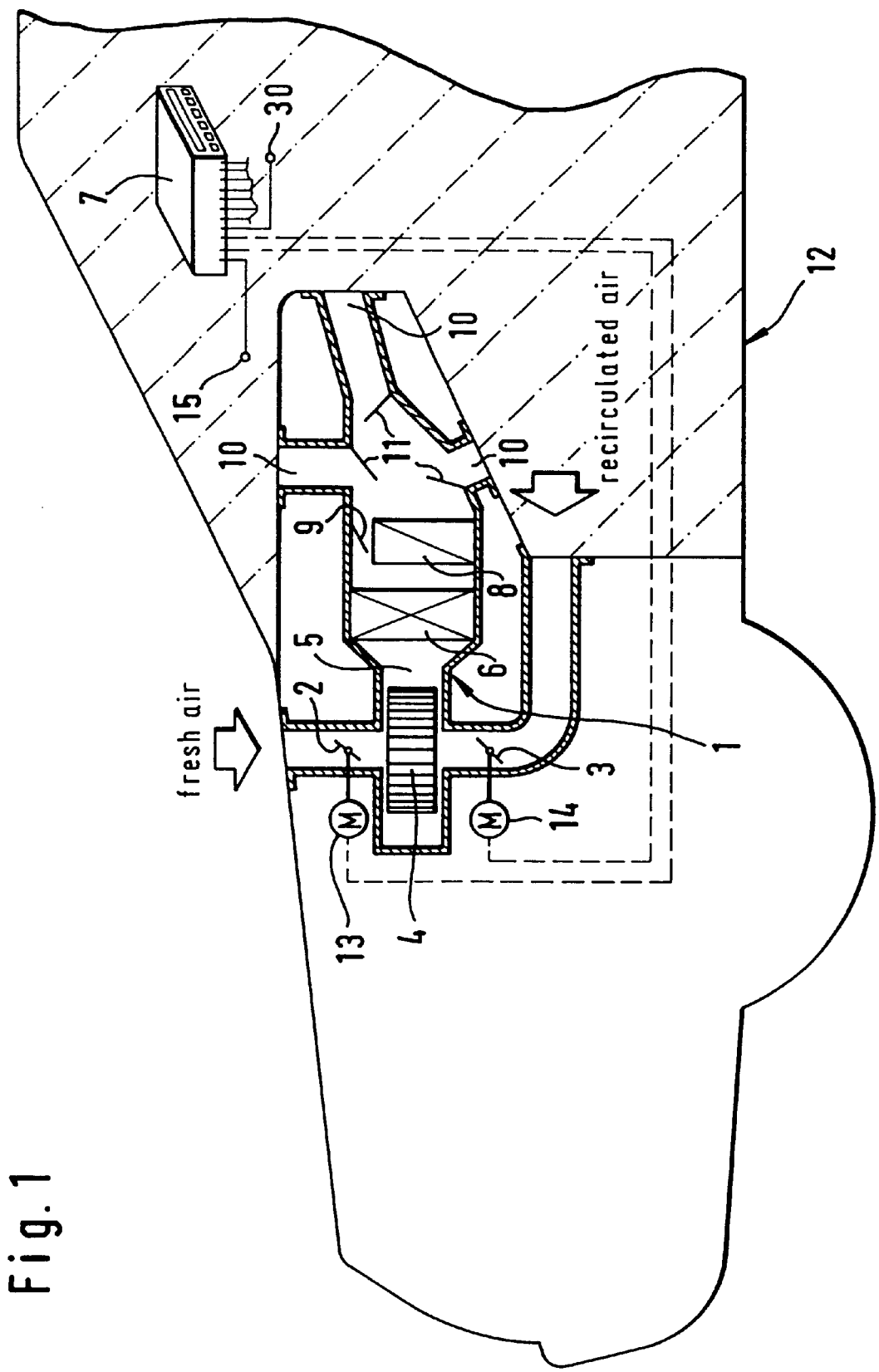
FIG. 1 shows an air-conditioning unit of a motor vehicle.

Fresh air is sucked in from the surroundings of the vehicle into the motor vehicle 12 via the fresh air flap 2 whose position is controlled by an actuator motor 13 as a function of electrical signals which are output by the air-conditioning control unit 7.

The circulating air from the passenger compartment of the motor vehicle is sucked in via the circulation flap 3 of the air-conditioning unit 1. The position of the circulating air flap 3 is also controlled by an actuator motor 14 as a function of electrical signals of the air-conditioning control unit 7. Circulating air and fresh air are fed into the air-conditioning unit 1 via the ventilator 4, as a result of which mixed air 5 is produced downstream of the ventilator 4.

This mixed air 5 is fed to the evaporator 6.

In the cooling mode, the mixed air 5 is output into the passenger compartment via outlets 10. These outlets 10 are arranged in ducts which point in the direction of the windscreen, in the direction of the driver or front seat passenger and in the direction of the footwell of the driver or front seat passenger. The ingress of air can be regulated by the driver or front seat passenger by means of the air distributor flaps 11 arranged in the individual ducts.

The evaporator 6 is adjoined by a heat exchanger 8. The quantity of air which is output by the evaporator 6 is led past the heat exchanger 8 with the aid of a temperature flap 9, and heated at said heat exchanger 8. In the heating mode, the correspondingly conditioned mixed air then flows into the passenger compartment.

The air-conditioning control unit 7 is usually arranged in, or in the vicinity of, the dashboard of the vehicle so that it can be easily operated by the driver and front seat passenger during the journey.

Figure 2:
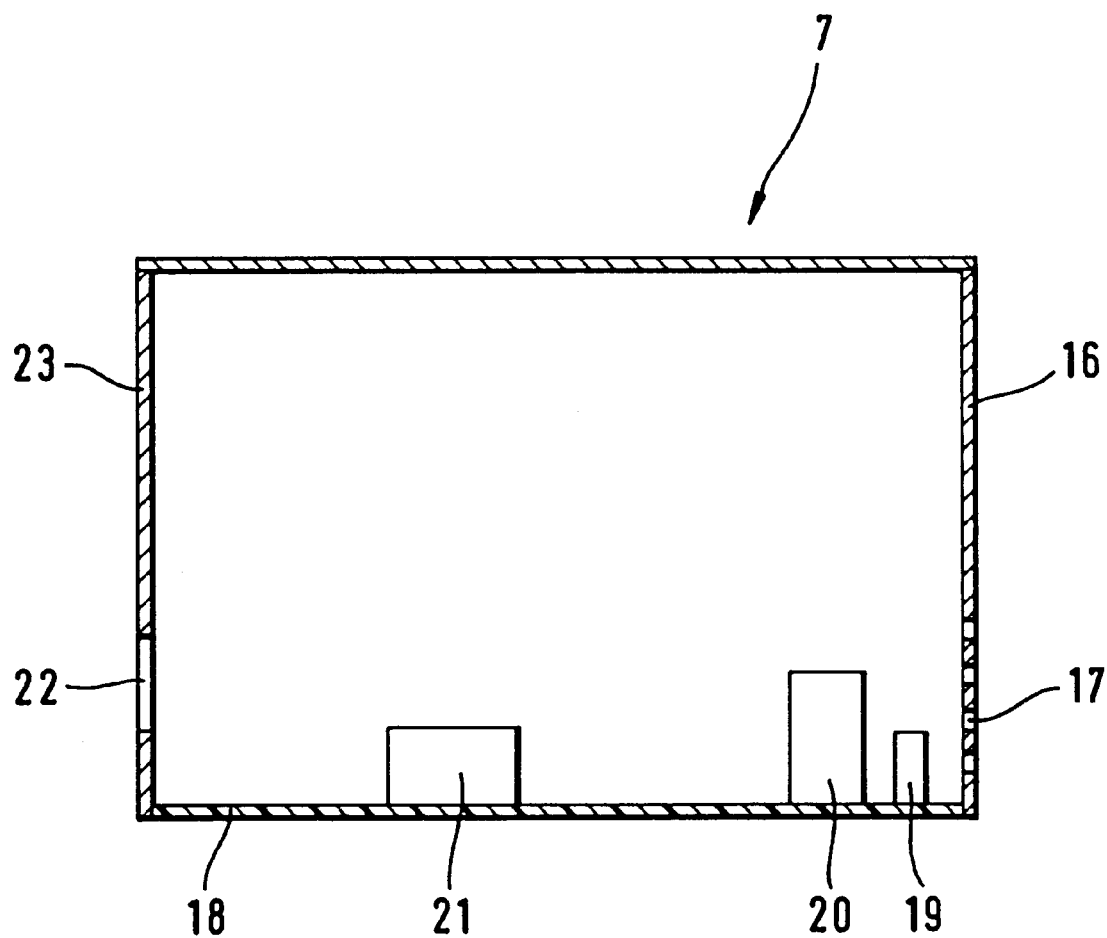
FIG. 2 shows a section through an air-conditioning control unit.

The schematic design of the air-conditioning control unit 7 is illustrated in FIG. 2.

On its front panel 16, the air-conditioning control unit 7 has control elements (not illustrated in more detail) for setting the vehicle air-conditioning system. The front panel 16 contains slots 17 through which room air is sucked into the air-conditioning control unit 7. In the air-conditioning control unit 7, a temperature sensor 9 of the passenger compartment and in the vicinity a fan motor 20 are arranged on a printed circuit board 18 directly behind the intake slots 17. A blade wheel by means of which the internal air is sucked in and the temperature sensor 19 of the passenger compartment is thus ventilated, is usually attached to the fan motor 20. However, the temperature sensor 19 of the passenger compartment and the fan motor 20 can also be arranged outside the air-conditioning control unit 7 at a measurement location within the passenger compartment of the motor vehicle, the output signal of the temperature sensor 19 of the passenger compartment being passed onto the air-conditioning control unit 7 and further processed there by a microprocessor 21 which is also arranged on the printed circuit board 18. However, it is also conceivable for both the measurement locations to be combined with one another.

The air which is sucked in by the fan motor 20 is output into the surroundings through the air output orifice 22 in the rear wall 23 of the air-conditioning control unit 7.

The air-conditioning control unit 7 is, as is clear from FIG. 1, is also connected to the terminal 30 (battery) and terminal 15 (switched positive pole in the battery—output ignition switch) connections of the motor vehicle and to an ambient temperature sensor, which is arranged in the radiator grill, and to a temperature sensor of the cooling water. It is also possible for the air-conditioning control unit 7 to receive the information on the ambient temperature and temperature of the cooling water via a data bus.

The method according to the invention will be explained in more detail with reference to various starting situations of the motor vehicle.

Basically, the fan motor is intended to run only if the ventilator 4 is also running because the noises of the fan motor 20 will then no longer be susceptible.

There are various starting situations of the motor vehicle which it is intended to take into account in the control. Firstly, it is determined whether the motor vehicle is undergoing a so-called warm start or cold start. This is analyzed by means of a time measurement. The time which passes between the switching off and switching on again of the terminal 30 is measured. If this time period is less than 16 minutes, it is a warm start. If this time is greater than 16 minutes, the situation with a cold start is occurring. Since the air-conditioning control unit 7 contains a microprocessor 21, the time measurement can easily be implemented by means of the clock signal transmitter which is present in the microprocessor in any case.

Another possible way of determining whether the motor vehicle is undergoing a cold start or a warm start consists in checking whether the loads of the air-conditioning control unit 7 in the motor vehicle are still active. Since, according to the standard which is usually used in motor vehicles, the loads are not switched off until after 16 minutes, it is necessary to determine whether or not the loads are still operating.

If a cold start has been detected, it is checked whether the motor vehicle has been switched off briefly or whether it was out of operation for 10 hours, for example. This is carried out by measuring the temperature of the cooling water. If the temperature of the cooling water exceeds a temperature threshold value for the cooling water, the ventilator 4 is immediately switched on as a noise-generating device which immediately ventilates the temperature sensor 19 of the passenger compartment. This means that the fan motor 20 starts up immediately. The automatic control of the ventilator 4 is not started up by the air-conditioning control unit 7 until a first-time period of approximately 30 to 60 seconds has expired. In this way the heated temperature sensor 19 of the passenger compartment is reliably prevented from supplying an incorrect initial value for the climatization control, which would result in an incorrect flap position and an incorrect automatic blower operation.

If it has been determined using the method steps described above that the starting situation of the motor vehicle is a warm start, the initial point of the climatization control is set using the external temperature.

If the external temperature which is actually measured in the surroundings of the motor vehicle drops below a temperature threshold value which is, for example, 5° C., the temperature sensor 19 of the passenger compartment is immediately ventilated if the ventilator 4 is switched on. However, if the terminal 15 is switched off, the passenger compartment temperature which is measured by the temperature sensor 19 of the passenger compartment is compared with the external temperature. If the passenger compartment temperature of the motor vehicle is higher than the external temperature, the passenger compartment temperature which is detected at this time is frozen for further climatization control for rising temperatures, i.e. the passenger compartment temperature which is measured at this time is used for the climatization control. Furthermore, there is provision that the automatic controller of the ventilator 4 must not be switched on until after a second time period of approximately 10 to 15 seconds after the fan motor 20.

If a warm start occurs at external temperatures which are higher than the external temperature threshold value of 5° C., in the event of a rise in passenger compartment temperature which is higher than the external temperature, the passenger compartment temperature which is measured at the time when the internal combustion engine is switched off is, as explained above, used for the climatization control as long as the terminal 15 is switched off. This provides a general start up of the ventilator.

However, as an alternative to this, the temperature value of the passenger compartment which is determined at a given time can also be used with simultaneous starting up of the fan motor 20 and ventilator 14. In this way, the correct passenger compartment temperature is measured quickly and the flaps and the automatic blower operation are also set to the correct value.

List of Reference Numerals

1. Air-conditioning unit
2. Fresh air flap
3. Circulating air flap
4. Ventilator
5. Mixed air
6. Refrigerating heat exchanger
7. Air-conditioning control unit
8. Heating heat exchanger
9. Temperature flap
10. Outlet
11. Air distributor flaps
12. Motor vehicle 13. Actuator motor
14. Actuator motor
15. Terminal: switched positive pole on battery
16. Front panel
17. Intake slot
18. Printed circuit board
19. Temperature sensor of passenger compartment
20. Fan motor
21. μR
22. Air outlet orifice
23. Rear wall
24. Battery terminal

What is claimed is:

1. A method for reliably determining the temperature of the passenger compartment of a motor vehicle comprising the steps of: ventilating a sensor which detects the internal temperature of the motor vehicle with a fan motors; only operating the fan simultaneously with another motor vehicle device which generates a noise; and compensating for heating of the sensor for the passenger compartment at a time when the motor vehicle starts.

2. The method as claimed in claim 1, wherein the device which generates a noise is an internal combustion engine of the motor vehicle.

3. The method as claimed in claim 1, wherein the device which generates a noise is a ventilator of the air-conditioning system.

4. The method as claimed in claim 1, wherein the step of compensating comprises determining a time after the ignition of the motor vehicle has been switched off and switched on again and comparing it with a time threshold value.

5. The method as claimed in claim 4, comprising the additional step of: when the time threshold value is exceeded, measuring the temperature of the internal combustion engine, and, when a temperature threshold value of the internal combustion engine is exceeded, immediately ventilating the passenger compartment temperature sensor by means of the fan motor.

6. The method as claimed in claim 5, comprising the step of: switching on the ventilator with a first damping time in relation to the fan motor.

7. The method as claimed in claim 5, wherein the temperature of the internal combustion engine is determined by means of the temperature of the cooling water.

8. The method as claimed in claim 4, comprising the step of: when the time threshold value is undershot, measuring the ambient temperature of the motor vehicle.

9. The method as claimed in claim 8, comprising the step of: comparing the temperature of the passenger compartment with the ambient temperature and, when the ambient temperature is exceeded, using the temperature of the passenger compartment which is measured at this time for controlling for rising temperatures of the passenger compartment.

10. The method as claimed in claim 6, wherein the temperature of the internal combustion engine is determined by means of the temperature of the cooling water.

* * * * *